S. H. PITKIN & J. H. STRATTON.
CHILIAN MILL.
APPLICATION FILED JULY 29, 1911.
1,031,730.
Patented July 9, 1912.
4 SHEETS—SHEET 2.
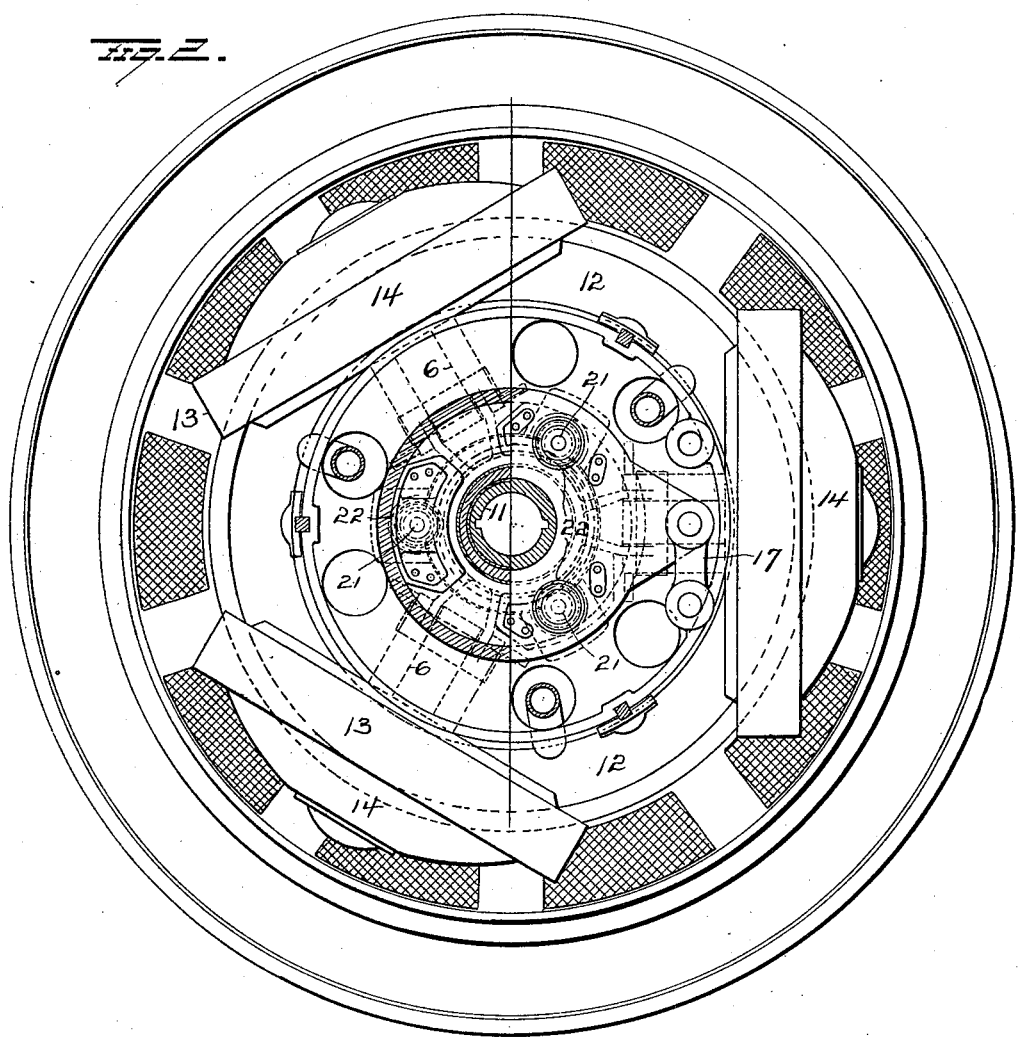
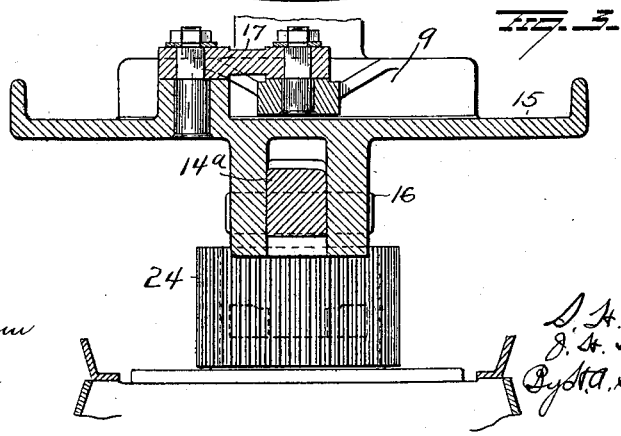

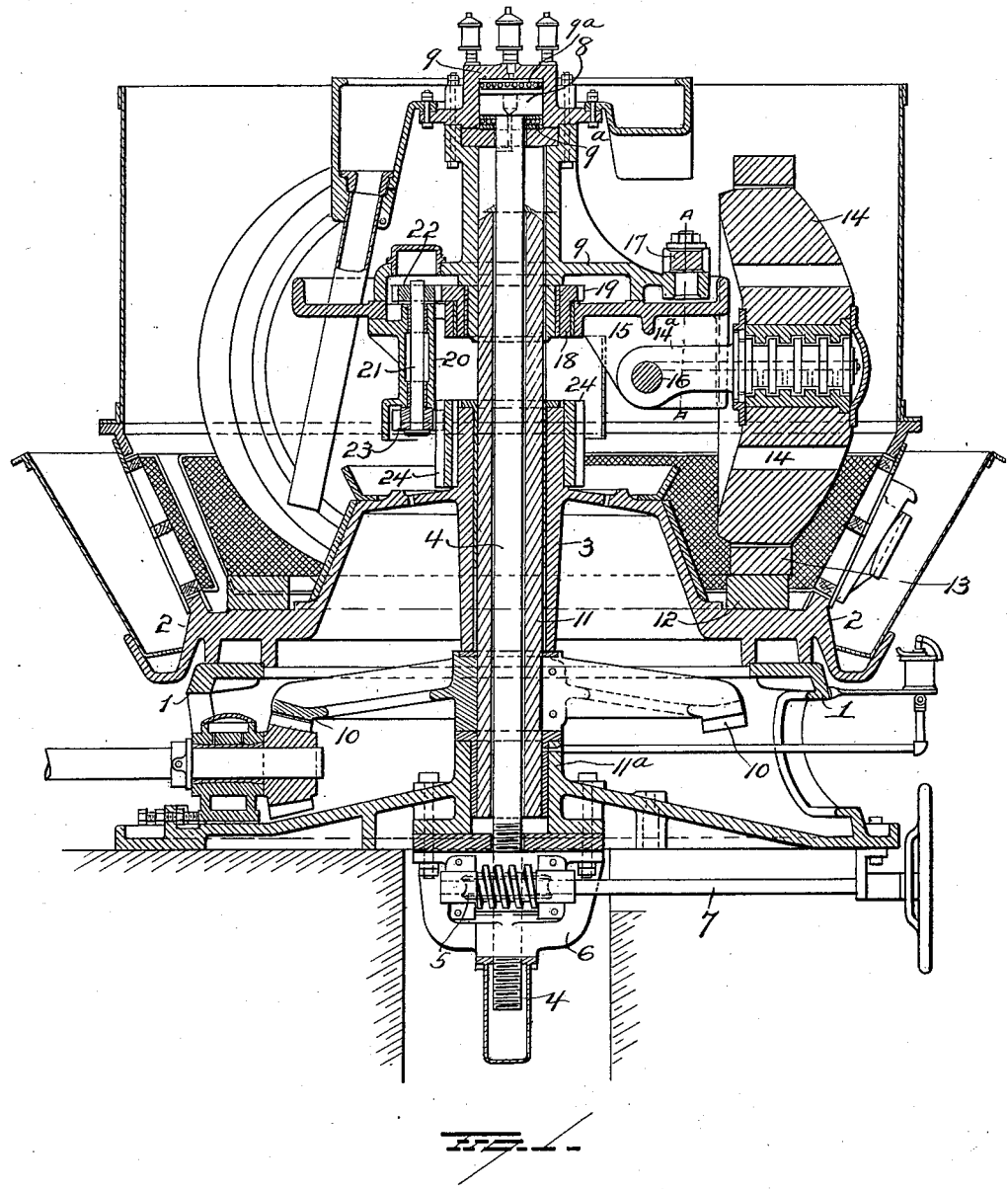

S. H. PITKIN & J. H. STRATTON.
CHILIAN MILL.
APPLICATION FILED JULY 29, 1911.
1,031,730.
Patented July 9, 1912.
4 SHEETS—SHEET 3.
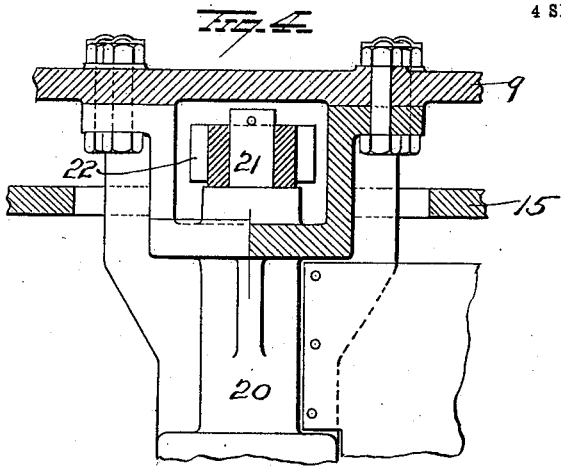
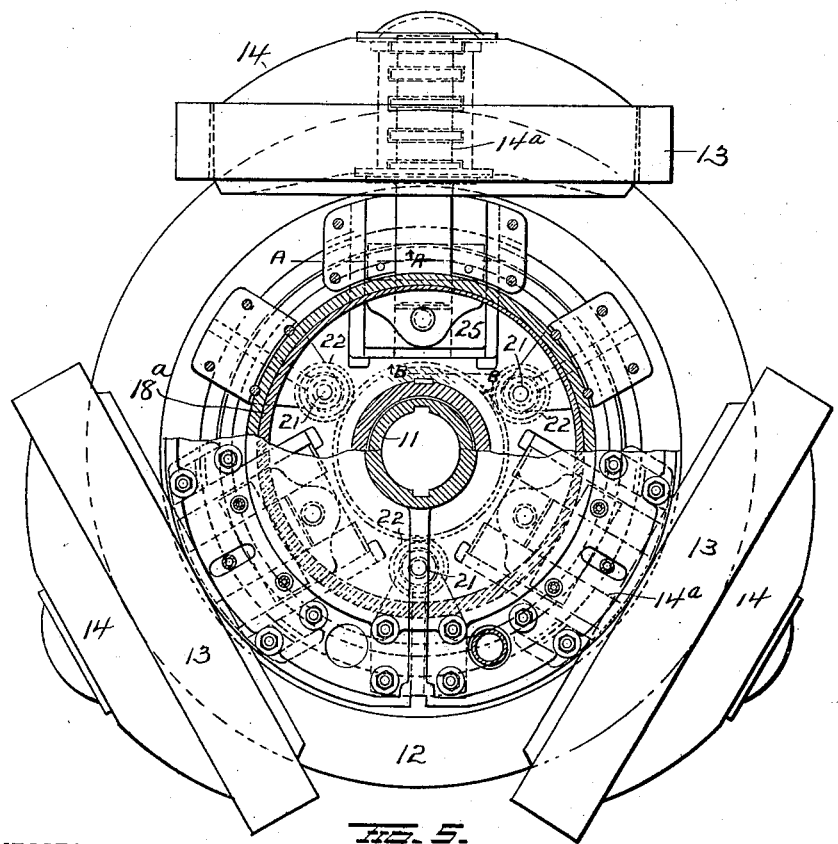

S. H. PITKIN & J. H. STRATTON.
CHILIAN MILL.
APPLICATION FILED JULY 29, 1911.
1,031,730.
Patented July 9, 1912.
4 SHEETS—SHEET 4.
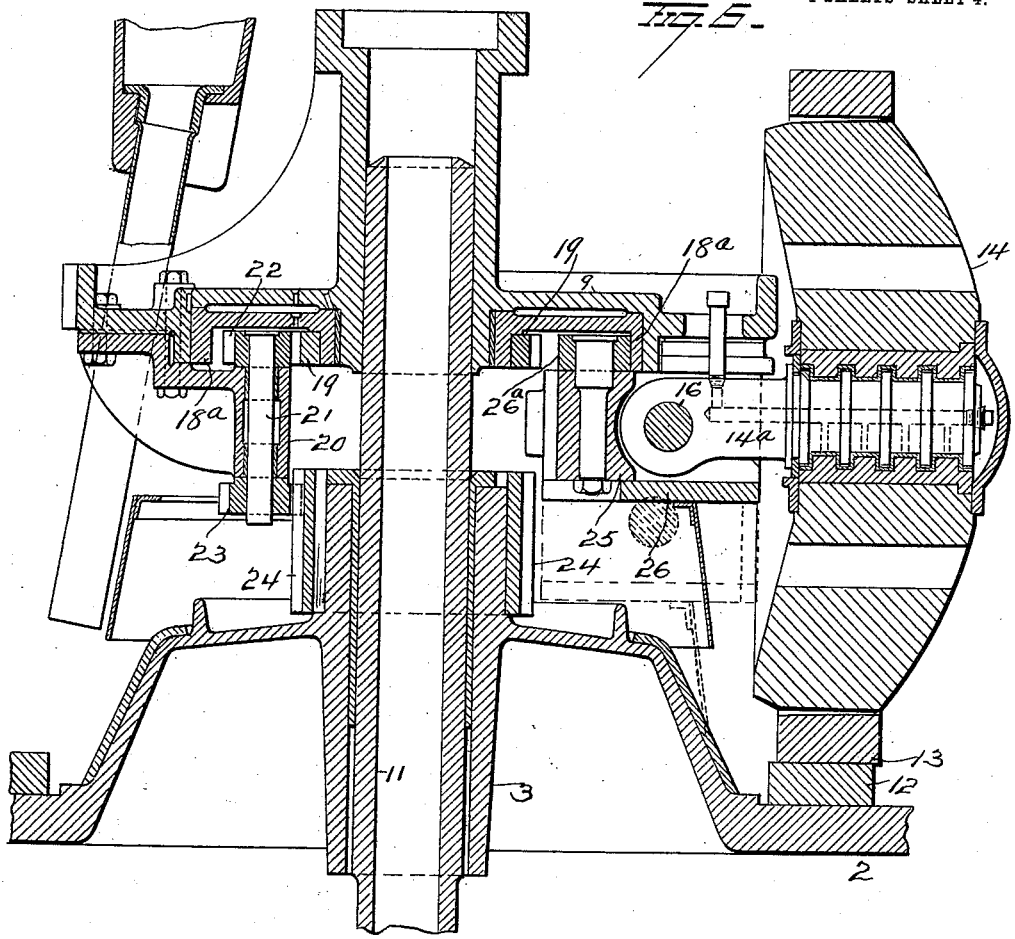
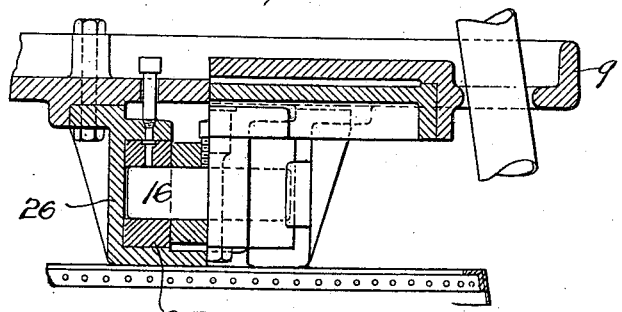
WITNESSES
INVENTORS

UNITED STATES PATENT OFFICE.

STEPHEN H. PITKIN AND JAMES H. STRATTON, OF CLEVELAND, OHIO, ASSIGNORS TO THE WELLMAN-SEAVER-MORGAN COMPANY, OF CLEVELAND, OHIO.

CHILIAN MILL.

1,031,730.  Specification of Letters Patent.  Patented July 9, 1912.

Application filed July 29, 1911. Serial No. 641,366.

*To all whom it may concern:*

Be it known that we, STEPHEN H. PITKIN and JAMES H. STRATTON, of Cleveland, in the county of Cuyahoga and State of Ohio, have invented certain new and useful Improvements in Chilian Mills; and we do hereby declare the following to be a full, clear, and exact description of the invention, such as will enable others skilled in the art to which it appertains to make and use the same.

Our invention relates to an improvement in Chilian mills and more particularly to improvements on the construction disclosed in our Patent No. 792,161 granted June 13th, 1905.

In our patented apparatus, and in others in which the crushing rollers and their dies travel in a circular path, upon a die ring, there is a decided tendency to uneven wear on the die ring, resulting in grooves, which seriously impair the efficiency of the mill, and the object of this invention is to obviate this tendency by providing means for changing the position of the crushing rollers, whereby the center of gravity of the latter travels in an elliptical path, the short diameter of the ellipse being across or transversely of the die.

With this object in view our invention consists in means for imparting to the crushing rollers a horizontal traversing motion across the face of the die ring.

Our invention further consists in the parts and combination of parts as will be more fully described and pointed out in the claims.

In the accompanying drawings, Figure 1 is a view in vertical section of our improved mill. Fig. 2 is a view partly in top plan and partly in section. Fig. 3 is a view in section on the line A A, of Fig. 1. Fig. 4 is a view showing the manner of securing the brackets to the driving head. Fig. 5 is a view partly in top plan and partly in section of a modified form. Fig. 6 is a view in vertical section of same, and Fig. 7 is a view one half of which is a section on line A A, and the other half a section on line B, B, of Fig. 5.

1 represents a base casting which latter carries the mortar 2, having a centrally located hollow hub 3, which, as shown, extends above the highest point of the mortar, and down in approximately the plane of the base casting 1.

4 is a spindle, provided with a threaded lower end which latter engages internal threads formed in the nut or worm wheel 5, which latter is carried by bracket 6 bolted to the underside of base casting 1, the said spindle having a feather and groove connection with the bracket whereby it is held against rotation. Mounted in bearings carried by bracket 6 is the worm shaft 7 which meshes with the teeth of worm wheel 5, and operates by its rotation, to rotate the worm wheel and elevate or lower spindle 4. The spindle is provided at its upper end with a thrust ring 8 for taking the vertical thrust from the driving head 9, through anti-friction or ball bearings 9ª located on both sides of the thrust ring. The main driving gear 10 is clamped or keyed to the hollow driving shaft or sleeve 11, which latter incloses the spindle, and is supported against vertical movement by the hub of gear 10 resting between bearing 11ª and the lower end of hub 3 of the mortar 2, both bearing surfaces being preferably provided with bronze bushings. The drive head 9 is secured to the upper end of this shaft or sleeve 11, so as to rotate therewith and is connected by the means, to be now described, with a series of crushing rollers, so that when the hollow shaft is rotated, the driving head will rotate therewith and carry the crushing rollers.

Located within the mortar 2 is the die ring 12 on which the tires 13 of three crushing rollers 14 travel. The rollers 14 are each mounted on an axle 14ª, each of which is connected to rotating head 15, by a horizontal pivot 16 which permits the roller to freely rise and fall in its movements over the ring die 12.

The rotating head 15 is connected to the driving head 9 by a link 17, so that, as the driving head is rotated by its direct connection with driving sleeve 11, the rotating head 15 will move simultaneously therewith. The rotating head has a central opening embracing the cam hub 18 of the gear 19, which latter is mounted to rotate on the hub of driving head 9, hence it will be seen that as the gear 19 and its cam 18 are rotated, an oscillating motion will be imparted to the rotating head 15, which as before explained carries the series of crushing rollers, the link connection 17, between the driving heads 9 and the rotating head permitting the additional movement imparted to it by the cam 18.

Mounted in brackets 20 carried by the driving head 9 are the shafts 21, each having a pinion 22, at its upper end, meshing with pinion 19, and each provided at its lower end with a pinion 23 meshing with the elongated gear 24 fixed to the upwardly projecting portion of the hub 3 of the mortar 2. There are three brackets 20, carrying shafts 21 and three pinions 22 and 23, and they together with the gears 19 and 24 constitute a planetary drive for the eccentric hub 18, so that as the driving head 9 is revolved, the hub 18 will be slowly revolved around the hub of said head, thus imparting an oscillating motion to the rotating head 15 and to the entire series of rollers 14, carried by said head 15. By this arrangement the rollers instead of traversing in a circular path, and thus wearing portions only of the ring die, are caused to move in a constantly changing elliptical path, so that all parts of the ring die and ring are equally subjected to wear.

In the construction shown in Figs. 5, 6 and 7, we have the same planetary arrangement, for imparting a lateral traversing movement to the rollers 14, but instead of employing a rotating head carrying the roller axles, we pivotally connect each of the latter to a sliding block 25 carried in brackets 26 bolted to the driving head 9, and the eccentric 18ª for imparting lateral movement to the rollers, instead of positively moving the rollers in and out, is annular in form and engages the outer face only of shoes or rollers 26ª, which are trunnioned to the sliding blocks 25, and operate to draw the blocks 25 and the connecting rollers inwardly toward the central shaft, the rollers being maintained in their extreme outward positions by centrifugal force.

With these constructions the lateral movement of the rollers carries the latter in a constantly changing elliptical path thus eliminating all tendency to the formation of grooves in the crushing surfaces.

It is evident that many slight changes might be resorted to in the relative arrangement of parts herein shown and described without departing from the spirit and scope of our invention. Hence we would have it understood that we do not wish to confine ourselves to the exact construction and arrangement of parts shown and described, but Having fully described our invention what we claim as new and desire to secure by Letters Patent, is:—

1. The combination with a stationary mortar, of a series of rollers, rotating means, devices connecting the rotating means and rollers, the connection between the rollers and rotating means being loose to permit the rollers to give or yield vertically and means for imparting lateral movement to the rotating rollers.

2. The combination with a stationary mortar, of a central shaft, means for rotating said shaft, a series of rollers, means connecting said shaft and the rollers for rotating the latter, and means actuated by the rotation of the shaft for imparting lateral movement to the rollers.

3. The combination with a mortar, a central rotating shaft, a driving head secured to said shaft, a series of crushing rollers, an axle for each roll, and means intermediate said driving head and axles and loosely connecting them, and means for imparting lateral movement to the rollers.

4. The combination with a fixed mortar, a ring die therein, a central shaft, means for rotating the latter, a series of rollers, an axle for each roller and means connecting the axles and the shaft, and means for imparting a longitudinal movement to the axles as the latter are carried around by the shaft.

5. The combination with a mortar, a shaft, means for rotating the latter, a driving head secured to said shaft, a series of crushing rollers, an axle for each roller, means loosely connecting the axles with the driving head, a cam for shifting the axles longitudinally, and gearing actuated by the rotation of the driving head for actuating said cam.

6. The combination with a mortar, a shaft, a driving head and a rotating head having a loose connection with the driving head, of a series of axles carried by said rotating head and having a free up and down movement, a crushing roller on each axle and means for shifting said rotating head laterally while it is rotating for imparting a lateral movement to the traversing crushing rollers.

7. The combination with a mortar, a shaft, a driving head, a rotating head, and a link connecting the two heads whereby they are caused to rotate in unison, of a series of axles having pivotal connection with the rotating head, a crushing roller on each axle, a cam for moving the rotating head and its series of crushing rollers in a horizontal direction and means for rotating the cam.

8. The combination with a mortar, a driving shaft, a driving head and a rotating head, of a series of stub axles pivoted to said rotating head, a crushing roller on each axle, a cam mounted to rotate on said driving head and engaging the rotating head for shifting the latter and the crushing rolls laterally, a gear rigid with said cam, a fixed gear and a series of pinions carried by the driving head and connecting the fixed gear and the gear on the cam, whereby the rotation of the driving head imparts a rotary motion to the cam.

In testimony whereof, we have signed this specification in the presence of two subscribing witnesses.

STEPHEN H. PITKIN.
JAMES H. STRATTON.

Witnesses:
HERBERT D. GLIDDEN,
H. A. PELOUBET.

---

Copies of this patent may be obtained for five cents each, by addressing the "Commissioner of Patents, Washington, D. C."